(12) United States Patent
Islam

(10) Patent No.: US 6,819,478 B1
(45) Date of Patent: Nov. 16, 2004

(54) FIBER OPTIC TRANSMISSION SYSTEM WITH LOW COST TRANSMITTER COMPENSATION

(75) Inventor: Mohammed N. Islam, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 38 days.

(21) Appl. No.: 10/100,587

(22) Filed: Mar. 15, 2002

(51) Int. Cl.[7] ............................................... H01S 3/00
(52) U.S. Cl. ..................................................... 359/334
(58) Field of Search ......................................... 359/334

(56) References Cited

U.S. PATENT DOCUMENTS

| | | | |
|---|---|---|---|
| 3,772,528 A | 11/1973 | Anderson | 307/88.3 |
| 4,616,898 A | 10/1986 | Hicks, Jr. | 350/96.15 |
| 4,700,339 A | 10/1987 | Gordon et al. | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,184,243 A | 2/1993 | Henmi et al. | 359/181 |
| 5,224,194 A | 6/1993 | Islam | 385/122 |
| 5,225,922 A | 7/1993 | Chraplyvy et al. | 359/124 |
| 5,343,322 A | 8/1994 | Pirio et al. | 359/173 |
| 5,369,519 A | 11/1994 | Islam | 359/173 |
| 5,485,536 A | 1/1996 | Islam | 385/31 |
| 5,521,738 A | 5/1996 | Froberg et al. | 359/184 |
| 5,557,442 A | 9/1996 | Huber | 359/179 |
| 5,559,920 A | 9/1996 | Chraplyvy et al. | 385/123 |
| 5,608,561 A | 3/1997 | Marcuse et al. | 359/161 |
| 5,623,508 A | 4/1997 | Grubb et al. | 372/3 |
| 5,629,795 A | 5/1997 | Suzuki et al. | 359/337 |
| 5,642,215 A | 6/1997 | Suzuki et al. | 359/161 |

(List continued on next page.)

FOREIGN PATENT DOCUMENTS

| | | | |
|---|---|---|---|
| EP | 0 829 980 A2 | 3/1998 | H04J/14/02 |
| EP | 0 903 877 A2 | 3/1999 | H04B/10/18 |
| EP | 0 911 926 A1 | 4/1999 | H01S/3/10 |
| EP | 0 959 578 A2 | 11/1999 | H04J/14/02 |
| EP | 1 054 489 A2 | 11/2000 | H01S/3/067 |
| EP | 1 069 712 A2 | 1/2001 | H04B/10/17 |
| EP | 1 180 860 A1 | 2/2001 | H04B/10/17 |
| WO | 98/36479 | 8/1998 | H01S/3/10 |
| WO | 98/42088 | 9/1998 | H04B/10/17 |
| WO | 99/43117 | 8/1999 | H04J/14/00 |
| WO | 99/66607 | 12/1999 | |
| WO | 00/49721 | 8/2000 | |
| WO | 00/72479 | 11/2000 | H04B/10/08 |
| WO | 00/73826 A2 | 12/2000 | G02B/6/00 |

OTHER PUBLICATIONS

Hiroji Masuda and Shingo Kawai, Ultra Wide–Band Raman Amplification With A Total Gain–Bandwidth of 132 nm Of Two Gain–Bands Around 1.5 µm, ECOC '99, Nice, France, pp. II–146–II–147, Sep. 26–30, 1999.

(List continued on next page.)

Primary Examiner—Nelson Moskowitz
Assistant Examiner—Deandra M. Hughes
(74) Attorney, Agent, or Firm—Baker Botts L.L.P.

(57) ABSTRACT

A fiber optic transmission system with low cost transmitter compensation includes an electro-absorption modulated laser operable to generate an optical signal for transmission over a fiber optic communication link. The system further includes a Raman amplifier stage coupled to the communication link, the Raman amplifier stage having a gain medium including a dispersion compensating fiber. The dispersion compensating fiber is operable to at least partially compensate for a distortion caused by the electro-absorption modulated laser. The Raman amplifier stage is operable to at least partially compensate for a loss associated with the dispersion compensation fiber.

93 Claims, 5 Drawing Sheets

U.S. PATENT DOCUMENTS

| | | | |
|---|---|---|---|
| 5,664,036 A | 9/1997 | Islam .......................... 385/31 |
| 5,673,280 A | 9/1997 | Grubb et al. .................. 372/3 |
| 5,778,014 A | 7/1998 | Islam .......................... 372/6 |
| 5,784,184 A | 7/1998 | Alexander et al. .......... 359/125 |
| 5,790,289 A | 8/1998 | Taga et al. .................. 359/124 |
| 5,796,909 A | 8/1998 | Islam .......................... 385/147 |
| 5,798,853 A | 8/1998 | Watanabe .................... 359/160 |
| 5,801,860 A | 9/1998 | Yoneyama .................. 359/124 |
| 5,815,518 A | 9/1998 | Reed et al. .................... 372/6 |
| 5,828,478 A | 10/1998 | Thomine et al. ............ 359/181 |
| 5,852,510 A | 12/1998 | Meli et al. .................. 359/341 |
| 5,872,647 A | 2/1999 | Taga et al. .................. 359/184 |
| 5,887,093 A | 3/1999 | Hansen et al. ................ 385/27 |
| 5,905,838 A | 5/1999 | Judy et al. .................. 385/123 |
| 5,953,138 A | 9/1999 | Ellis .......................... 359/123 |
| 5,959,750 A | 9/1999 | Eskildsen et al. ........... 359/134 |
| 5,959,766 A | 9/1999 | Otterbach et al. .......... 359/337 |
| 5,978,130 A | 11/1999 | Fee et al. .................... 359/341 |
| 5,995,275 A | 11/1999 | Sugaya ........................ 359/341 |
| 6,005,702 A | 12/1999 | Suzuki et al. ................ 359/183 |
| 6,040,933 A | 3/2000 | Khaleghi et al. ............ 359/124 |
| 6,043,927 A | 3/2000 | Islam .......................... 359/332 |
| 6,049,413 A | 4/2000 | Taylor et al. ................ 359/337 |
| 6,052,393 A | 4/2000 | Islam .......................... 372/6 |
| 6,055,092 A | 4/2000 | Sugaya et al. ............... 359/337 |
| 6,067,177 A | 5/2000 | Kanazawa ................... 359/124 |
| 6,072,601 A | 6/2000 | Toyohara .................... 358/484 |
| 6,081,360 A | 6/2000 | Ishikawa et al. ............ 359/161 |
| 6,081,366 A | 6/2000 | Kidorf et al. ............... 359/341 |
| 6,088,152 A | 7/2000 | Berger et al. ............... 359/334 |
| 6,094,296 A | 7/2000 | Kosaka ........................ 359/341 |
| 6,097,524 A | 8/2000 | Doran et al. ................. 359/179 |
| 6,101,024 A | 8/2000 | Islam et al. .................. 359/334 |
| 6,104,848 A | 8/2000 | Toyohara et al. ............ 385/24 |
| 6,115,157 A | 9/2000 | Barnard et al. .............. 359/124 |
| 6,115,173 A | 9/2000 | Tanaka et al. ............... 359/333 |
| 6,115,174 A | 9/2000 | Grubb et al. ................ 359/334 |
| 6,134,034 A | 10/2000 | Terahara ...................... 359/124 |
| 6,141,127 A | 10/2000 | Boivin et al. ................ 359/124 |
| 6,147,794 A | 11/2000 | Stentz ......................... 359/334 |
| 6,151,160 A | 11/2000 | Ma et al. .................... 359/341 |
| 6,163,394 A | 12/2000 | Webb .......................... 359/181 |
| 6,163,636 A | 12/2000 | Stentz et al. ................. 385/24 |
| 6,172,803 B1 | 1/2001 | Masuda et al. .............. 359/341 |
| 6,181,449 B1 | 1/2001 | Taga et al. .................. 359/124 |
| 6,181,464 B1 | 1/2001 | Kidorf et al. ............... 359/334 |
| 6,185,022 B1 | 2/2001 | Harasawa .................... 359/124 |
| 6,191,854 B1 | 2/2001 | Grasso et al. ............... 356/341 |
| 6,204,949 B1 | 3/2001 | Ishikawa et al. ............ 359/161 |
| 6,219,162 B1 | 4/2001 | Barnard et al. .............. 359/124 |
| 6,219,176 B1 | 4/2001 | Terahara ...................... 359/341 |
| 6,229,937 B1 | 5/2001 | Nolan et al. .................. 385/24 |
| 6,236,488 B1 | 5/2001 | Shimizu et al. ............. 359/187 |
| 6,239,902 B1 | 5/2001 | Islam et al. .................. 359/334 |
| 6,239,903 B1 | 5/2001 | Islam et al. .................. 359/337 |
| 6,246,498 B1 | 6/2001 | Dishman et al. ............ 359/123 |
| 6,252,700 B1 | 6/2001 | Hwang et al. ............... 359/337 |
| 6,263,139 B1 | 7/2001 | Kawakami et al. ......... 385/123 |
| 6,271,945 B1 | 8/2001 | Terahara ...................... 359/124 |
| 6,282,002 B1 | 8/2001 | Grubb et al. ................ 359/160 |
| 6,310,716 B1 | 10/2001 | Evans et al. ................. 359/334 |
| 6,320,884 B1 | 11/2001 | Kerfoot, III et al. .......... 372/3 |
| 6,323,993 B1 * | 11/2001 | Hansen et al. .............. 359/337 |
| 6,335,820 B1 | 1/2002 | Islam .......................... 359/334 |
| 6,344,922 B1 | 2/2002 | Grubb et al. ................ 359/334 |
| 6,356,383 B1 | 3/2002 | Cornwell, Jr. et al. ...... 359/334 |
| 6,356,384 B1 | 3/2002 | Islam .......................... 359/334 |
| 6,359,725 B1 | 3/2002 | Islam .......................... 359/334 |
| 6,370,164 B1 | 4/2002 | Islam .......................... 372/6 |
| 6,374,006 B1 | 4/2002 | Islam et al. ................... 385/15 |
| 6,381,391 B1 | 4/2002 | Islam et al. .................. 385/123 |
| 6,388,801 B1 | 5/2002 | Sugaya et al. ............... 359/334 |
| 6,404,523 B1 | 6/2002 | Morikawa et al. ........... 359/124 |
| 6,404,964 B1 | 6/2002 | Bhagavatula et al. ....... 385/123 |
| 6,414,786 B1 | 7/2002 | Foursa ........................ 359/334 |
| 6,417,959 B1 | 7/2002 | Bolshtyansky et al. ..... 359/334 |
| 6,437,906 B1 | 8/2002 | Di Pasquale et al. ..... 359/337.2 |
| 6,529,315 B2 | 3/2003 | Bartolini et al. ............ 359/334 |
| 2001/0014194 A1 | 8/2001 | Sasaoka et al. ............... 385/15 |
| 2001/0050802 A1 | 12/2001 | Namiki et al. .......... 359/337.11 |
| 2002/0001123 A1 | 1/2002 | Miyakawa et al. .......... 359/334 |
| 2002/0048062 A1 | 4/2002 | Sakamoto et al. ........... 359/124 |
| 2002/0060821 A1 | 5/2002 | Manna et al. ................ 359/124 |
| 2003/0043431 A1 * | 3/2003 | Chand et al. ................ 359/135 |

OTHER PUBLICATIONS

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59.

Chraplyvy et al., "Equalization in Amplified WDM Light-wave Transmission Systems," IEEE Photonics Technology Letters, vol. 4, No. 8, pp. 920–922, Aug. 1992.

Sekine et al., "10Gbit/s four–channel WDM transmission experiment over 500km with technique for suppressing four–wave mixing," Electronics Letters, vol. 30, No. 14, pp. 1150–1151, Jul. 07, 1994.

Hansen et al., "Repeaterless transmission experiment employing dispersion," 21st European Conference on Optical Communication, vol. 2, 1 page, Sep. 17–21, 1995.

Liaw et al., "Passive Gain–Equalized Wide–Band Erbium–Doped Fiber Amplifier Using Samarium–Doped Fiber," IEEE Photonics Technology Letters, vol. 8, No. 7, pp. 879–881, Jul. 1996.

Baney et al., "WDM EDFA Gain Characterization with a Reduced Set of Saturating Channels," IEEE Photonics Technology Letters, vol. 8, No. 12, pp. 1615–1617, Dec. 1996.

Goel et al., "Wide–Band Dispersion Compensating Optical Fiber," IEEE Photonics Technology Letters, vol. 8, No. 12, pp. 1668–1670, Dec. 1996.

White et al.; "Optical Fiber Components and Devices," Optical Fiber Telecommunications, Ch. 7, pp. 267–319, 1997.

Agrawal, "Fiber–Optic Communication Systems," Second Edition, Basic Concepts, 2nd Ed. John Wiley & Sons, pp. 365–366 plus title page and copyright page, 1997.

Masuda et al., "Ultra–wideband optical amplification with 3dB bandwidth of 65 nm using a gain–equalised two–stage erbium–doped fibre amplifier and Raman amplification," Electronics Letters, vol. 33, No. 9, pp. 73–78, Feb. 24, 1997.

Tonguz et al., "Gain Equalization of EDFA Cascades," Journal of Lightwave Technology, vol. 15, No. 10, pp. 1832–1841, Oct. 1997.

Kawai et al., "Ultrawide, 75–nm 3–dB gain–band optical amplifier utilizing erium–doped fluoride fiber and Raman fiber," Tuesday Afternoon, OFC Technical Digest, TuG3, pp. 32–33, 1998.

Rotwitt et al., "Distribution Raman Amplifiers for Long Haul Transmission Systems," IEEE, pp. 251–252, 1998.

Rottwitt, et al., "A 92 nm Bandwidth Raman Amplifier," OSA Optical Fiber Conference, San Jose, CA, paper PD–6, pp. 1–4, Feb. 1998.

Hansen et al.; "Loss compensation in dispersion compensating fiber modules by Raman amplification," Optical Fiber Conference OFC'98, Technical Digest TuD1, pp. 20–21, Feb. 1998.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998. pg,10

Dianov et al., "High efficient 1.3$\mu$m Raman fiber amplifier," Electronics Letters, vol. 34, No. 7, 2 pages, Apr. 02, 1998.

Ma et al., "240–km Repeater Spacing in a 5280–km WDM System Experiment Using 8×2.5 Gb/s NRZ Transmission," IEEE Photonics Technology Letters, vol. 10, No. 6, pp. 893–895, Jun. 1998.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Chernikov et al., "Broadband Silica Fibre Raman Amplifiers at 1.3 $\mu$m and 1.5 $\mu$m," ECOC, pp. 49–50, Sep. 20–24, 1998.

Letellier et al., "Access to Transmission Performance Margins Through Pre–emphasis Adjustment in WDM Systems," ECOC, pp. 275–276, Sep. 20–24, 1998.

Becker et al., "Erbium Doped Fiber Amplifiers Fundamentals and Technology," Academic Press, pp. 55–60 plus title page and copyright page, 1999.

Chernikov et al., "Broadband Raman amplifiers in the spectral range of 1480–1620 nm," OFC/IOOC Technical Digest, vol. 2, pp. 117–119, Feb. 21–26, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual–wavelength–pumped silica fibre Raman amplifiers," Electronics Letters, vol. 35, No. 14, pp. 1178–1179, Jul. 08, 1999.

Suzuki et al., "50 GHz spaced, 32×10, Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 08, 1999.

Emori et al., "100nm bandwidth flat–gain Raman amplifiers pumped and gain–equalised by 12–wavelength–channel EDM laser diode unit," Electronics Letters, vol. 35, No. 16, pp. 1355–1356, Aug. 05, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Mikkelson et al., "160 Gb/s TDM Transmission Systems," ECOC, 4 pages.

Manna et al., "Modeling of Penalties on Chains of Optical Amplifiers with Equalizing Filters," Journal of Lightwave Technology, vol. 18, No. 3, pp. 295–300, Mar. 2000.

Nielsen et al., "3.28 Tb/s (82/spl times 40 Gb/s) transmission over 3/spl times 100 km nonzero–dispersion fiber using dual C– and L–band hybrid Raman/erbium–doped inline amplifiers," OFCC 2000, pp. 236–238 plus internet title page, Mar. 7–10, 2000.

Cravotta, "DWDM: feeding our insatiable appetite for bandwidth (Technology Information)," FindArticles.com, http://www.findarticles.com, 8 pages, Sep. 01, 2000.

Sano et al., "20 Gbit/s chirped return–to–zero transmitter with simplified configuration using electro–absorption modulator," Electronics Letters, vol. 36, No. 22, 2 pages, Oct. 26, 2000.

Fludger et al., "Fundamental Noise Limits in Broadband Raman Amplifiers," OFC, pp. MA5/1–MA5/3, 2001.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Seo et al., "Simultaneous Amplification and Channel Equalization Using Raman Amplifier for 30 Channels in 1.3–$\mu$m Band," Journal of Lightwave Technology, vol. 19, No. 3, pp. 391–397, Mar. 2001.

Chen et al., "Transient effects in saturated Raman amplifiers," Electronics Letters, vol. 37, No. 6, 2 pgs, Mar. 15, 2001.

Tomkos et al. "Demonstration of Negative Dispersion Fibers for DWDM Metropolitan Area Networks," IEEE Journal on Selected Topics in Quantum Electronics, vol. 7, No. 3, pp. 439–460, May 2001.

Optical Society of America, Optical Amplifiers and Their Applications, Technical Digest, entitled "Raman amplification and dispersion–managed solitons for all–optical, ultra–long–haul, dense WDM," with copy of slides presented at OSA, Stresa, Italy attached, Jul. 1–4, 2001.

Menif et al., "Application of Preemphasis to Achiev Flat Output OSNR in Time–Varying Channels in Cascaded EDFAs Without Equalization," Journal of Lightwave Technology, vol. 19, No. 11, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Woodfin et al. "Negative–dispersion fiber in metropolitan networks," Lightwave, 8 pages, Jan. 2002.

Scheerer et al., "SRS Crosstalk in Preemphasized WDM Systems," pp. WM28–1/293–WM28–3/295.

"Forward Error Correction in Optical Transmission, Reed Solomon and Turbo Product Codes compared," 2 pages.

Yariv, "Optical Electronics in Modern Communications," Detection of Optical Radiation, Ch. 11, pp. 412–473.

Nissov et al., "100 Gb/s (10×10Gb/s) WDM Transmission Over 7200 km Using Distributed Raman Amplification," pp. 9–12.

Tashiro et al., "1.5 W Erbium Doped Fiber Amplifier Pumped by the Wavelength Division–Multiplexed 1480 nm Laser Diodes with Fiber Bragg Grating," Optical Transmission Systems Group, paper WC2–1–3, pp. 213–213.

Walker, "Status and challenges of optical fiber amplifiers and lasers," paper MB–1–3, pp. 12–14.

Srivastava et al., "High–speed WDM Transmission in All-Wave™ Fiber in both the 1.4–$\mu$m and 1.55–$\mu$m Bands," paper PD–2–5, Vail, Co.

Emori et al., "Less than 4.7 dB Noise Figure Broadband In-line EDFA with a Raman Amplified-1300 ps/nm DCF Pumped by Multi-channel WDM Laser Diodes," paper PD3-1-5.

Koch et al., "Broadband gain flattened Raman Amplifier to extend operation in the third telecommunication window," FF3-1-3, pp. 103-105.

Emori et al., "Cost-effective depolarized diode pump unit designed for C-band flat-gain Raman amplifiers to control EDFA gain profile," FF4-1-3, pp. 106-108.

Pending patent application; WO 99/66607; entitled "Dispersion Compensating and Amplifying Optical Element, Method for Minimizing Gain Tilt, and Apparatus for Minimizing Non-Linear Interaction between Band Pumps," by Mohammed N. Islam et al, Filed Jun. 16, 1999.

Pending patent application; USSN 09/766,489; entitled "Nonlinear Polarization Amplfiers in Nonzero Dispersion Shifted Fiber," by Mohammed N. Islam, Filed Jan. 19, 2001.

Pending patent application; USSN 09/765,972; entitled "S+ Band Nonlinear Polarization Amplifiers," by Mohammed N. Islam, Filed Jan. 19, 2001.

Pending patent application, USSN 09/768,367, entitled "All Band Amplifier," pp. 1-57, by Mohammed N. Islam, Filed Jan. 22, 2001.

Pending patent application, USSN 09/800/085; entitled "Dispersion Compensating Nonlinear Polarization Amplifier," by Mohammed N. Islam, Filed Mar. 05, 2001.

Pending patent application, USSN 09/811,067, entitled "Method and System for Reducing Dedgredation of Optical Signal to Noise Ratio," by Mohammed N. Islam et al, Filed Mar. 16, 2001.

Pending patent application, USSN 09/811,103; entitled "System and Method for Wide Band Raman Amplification," Mohammed N. Islam et al, Filed Mar. 16, 2001.

Pending patent application; USSN 09/916,454; entitled "System and Method for Controlling Noise Figure," pp. 1-51, by Mohammed N. Islam et al, Filed Jul. 27, 2001.

Pending patent application; USSN 10/003,199; entitled "Broadband Amplifier and Communication System," by Mohammed N. Islam, Filed Oct. 30, 2001.

Pending patent application; USSN 10/007,643; entitled "Multi-Stage Optical Amplifier and Broadband Communication System," by Mohammed Islam, Filed Oct. 30, 2001.

Pending patent application; USSN 10/005,472; entitled "Multi-Stage Optical Amplifier and Broadband Communication System," by Mohammed N. Islam, Filed Nov. 06, 2001.

Pending patent application; USSN 09/990,142; entitled "Broadband Amplifier and Communication System," Mohammed N. Islam, Filed Nov. 20, 2001.

Pending patent application; USSN 10/014,839; entitled "Multi-Stage Optical Amplifier and Broadband Communication System," by Mohammed N. Islam, Filed Dec. 10, 2001.

Pending patent application; USSN 10/100,591; entitled "System and Method for Managing System Margin," pp. 1-89, by Mohammed N. Islam et al, Filed Mar. 15, 2002.

Pending patent application; USSN 10/116,487; entitled "Fiber Optic Transmission System for a Metropolitan Area Network," pp. 1-54, by Mohammed N. Islam, Filed Apr. 03, 2002.

Pending patent application; USSN 10/170,245; entitled "Active Gain Equalization," by Mohammed N. Islam et al, Filed Aug. 02, 2002.

* cited by examiner

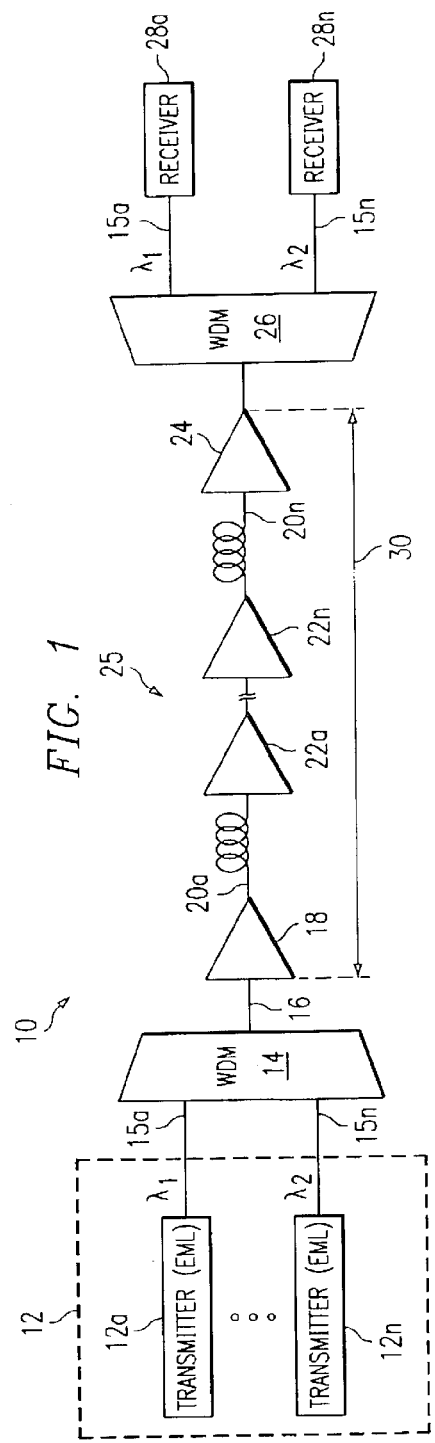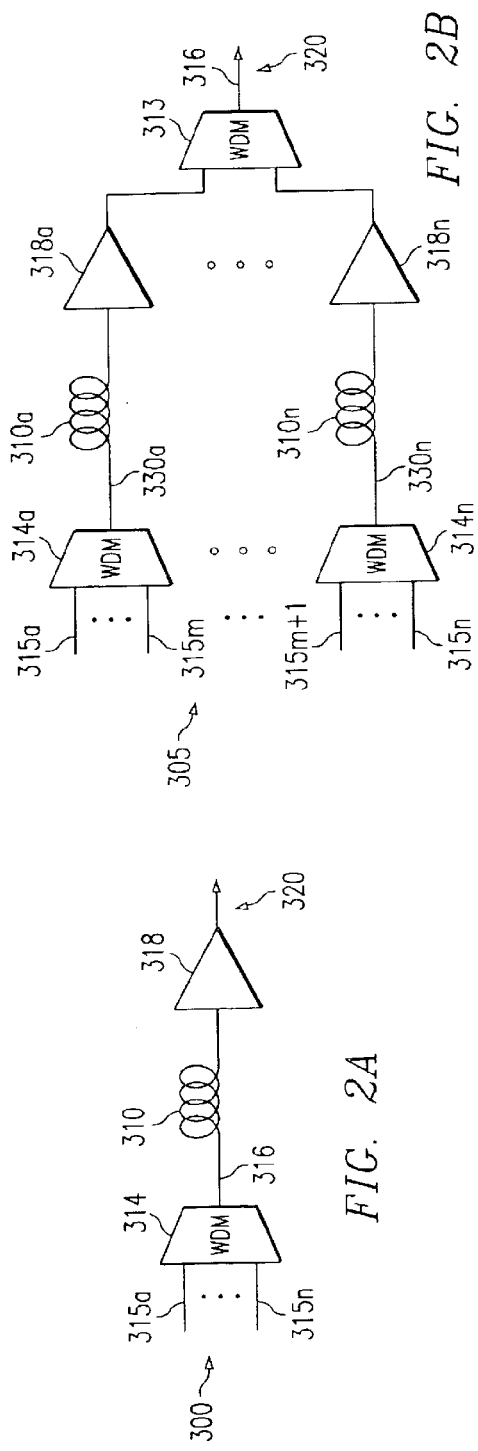

FIBER OPTIC TRANSMISSION SYSTEM WITH LOW COST TRANSMITTER COMPENSATION

TECHNICAL FIELD OF THE INVENTION

The present invention relates in general to fiber optics technology and more particularly to a fiber optic transmission system with low cost transmitter compensation.

OVERVIEW

Inexpensive optical components, such as electro-absorption modulated lasers have several limitations that can affect optical signal transport. These limitations include a relatively low extinction rate, a low output power, and a relatively high chirp. A chirped signal effectively has a time varying change in its central wavelength over the duration of a pulse. This will produce a distortion as the corresponding frequency components at different points travel at different effective velocities. In light of these limitations, conventional optical communication systems have largely avoided the use of electro-absorption modulated lasers.

SUMMARY OF EXAMPLE EMBODIMENTS

The present invention recognizes a need for a system and method operable to effectively and economically reduce distortion caused by low cost transmitters, such as electro-absorption modulators. In accordance with the present invention, a fiber optic transmission system with low cost transmitter compensation is provided that substantially eliminates or greatly reduces disadvantages and problems associated with conventional fiber optic systems.

According to one embodiment, a fiber optic transmission system with low cost transmitter compensation comprises an electro-absorption modulated laser operable to generate an optical signal for transmission over a fiber optic communication link. The system further comprises a Raman amplifier stage coupled to the communication link, the Raman amplifier stage having a gain medium including a dispersion compensating fiber. The dispersion compensating fiber is operable to at least partially compensate for a distortion caused by the electro-absorption modulated laser. The Raman amplifier stage is operable to at least partially compensate for a loss associated with the dispersion compensation fiber.

According to another embodiment, a fiber optic transmission system with low cost transmitter compensation comprises an electro-absorption modulated laser operable to generate an optical signal for transmission over a fiber optic communication link, and a Raman amplifier stage coupled to the communication link. The Raman amplifier stage comprises a gain medium having a negative sign of dispersion. The gain medium is operable to at least partially compensate for a chirp caused by the electro-absorption modulated laser, and the Raman amplifier stage is operable to at least partially compensate for a loss associated with the gain medium.

In yet another embodiment, a fiber optic transmission system with low cost transmitter compensation comprises a continuum source comprising a continuum source transmitter operable to generate an approximate spectral continuum and a signal splitter operable to separate the approximate spectral continuum into a plurality of wavelength signals for transmission over a fiber optic communication link. The system further comprises a Raman amplifier stage coupled to the communication link, the Raman amplifier stage having a gain medium including a dispersion compensating fiber. The dispersion compensating fiber is operable to at least partially compensate for a distortion caused by the continuum source, and wherein the Raman amplifier stage is operable to at least partially compensate for a loss associated with the dispersion compensation fiber.

In a method embodiment, a method for compensating low cost transmitter signal distortion comprises receiving from a communication link at a Raman amplification stage comprising a dispersion compensating fiber serving as at least a portion of a gain medium, an optical signal generated using an electro-absorption modulated laser. The optical signal has a distortion caused by the laser. The method further comprises performing dispersion compensation in the Raman amplification stage to at least partially compensate for the distortion caused by the electro-absorption modulated laser, and performing amplification in the Raman amplification stage to compensate for a loss introduced by the dispersion compensation.

In another method embodiment, a method for compensating low cost transmitter signal distortion comprises receiving from a communication link at a Raman amplification stage comprising a gain medium having a negative slope of dispersion, an optical signal generated using an electro-absorption modulated laser. The optical signal comprises a distortion caused by the laser. The method further comprises performing dispersion compensation in the Raman amplification stage using the gain medium to at least partially compensate for the distortion caused by the electro-absorption modulated laser, and performing amplification in the Raman amplification stage to compensate for a loss introduced by the dispersion compensation.

Numerous technical advantages are provided according to various embodiments of the present invention. Particular embodiments of the invention may exhibit none, some, or all of the following advantages depending on the implementation. For example, in one embodiment, signal distortion, such as chirp, is reduced or eliminated using a dispersion compensating element that is coupled to or part of the communication link. A Raman amplification stage at least partially compensates for losses induced to the system by the dispersion compensating element. In some cases, the Raman amplification stage may impart a net gain to the optical signal in the gain fiber.

In one particular embodiment, the dispersion compensating element can comprise a fiber having a negative slope of dispersion, which comprises all or a portion of a gain medium of the amplifier stage. In other embodiments, the dispersion compensating element could comprise a dispersion compensating fiber comprising all or a portion of a gain medium of the Raman amplifier stage. In either case, the dispersion compensating gain fiber can be pumped to provide gain sufficient to offset at least some losses of the dispersion compensating element. In some cases, the gain fiber can be pumped sufficiently to provide a net gain to the optical signal.

These techniques facilitate the use of relatively inexpensive components, such as EMLs, at relatively high bit rates (e.g., more than 9.5 gigabits per second), while maintaining acceptable system performance levels. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which:

FIG. 1 illustrates a simplified block diagram of a fiber optic transmission system.

FIGS. 2A–E illustrate example dispersion compensation implementations at a booster amplifier of the fiber optic transmission system;

DETAILED DESCRIPTION OF EXAMPLE EMBODIMENTS

Figure 2C:
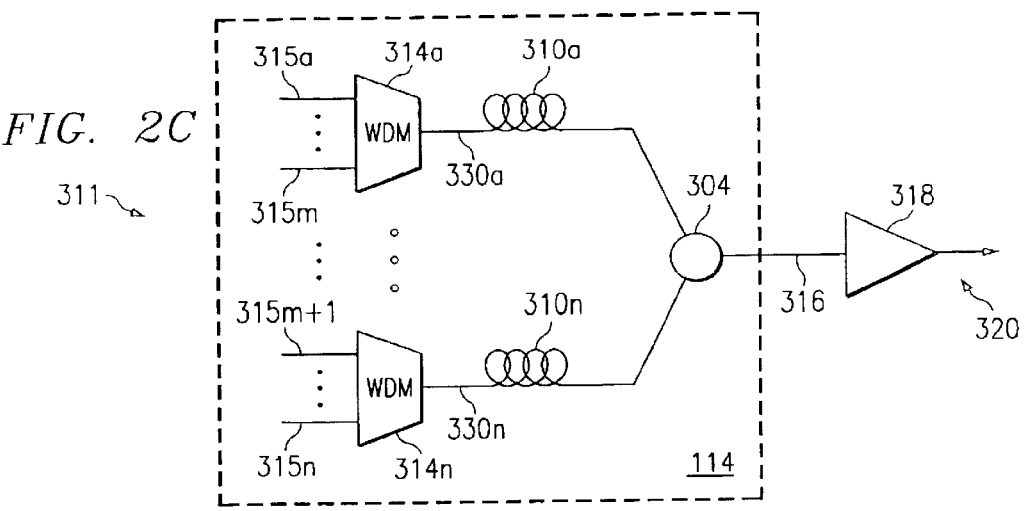

FIG. 1 is a block diagram showing at least a portion of an exemplary optical communication system 10 operable to facilitate communication of one or more multiple wavelength signals. In some embodiments, system 10 may comprise the entire optical communication system from beginning to end. In other embodiments, system 10 may comprise a portion of a larger optical communication system. In those embodiments, elements shown as containing transmitters and/or receivers could comprise optical regenerators residing within a larger multiple link communication system.

In this example, system 10 includes a transmitter assembly 12 operable to generate a plurality of optical signals (or channels) 15a–15a, each comprising a center wavelength of light. In some embodiments, each optical signal 15a–15a can comprise a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength.

All or a portion of transmitter assembly 12 could reside, for example, within a transponder capable of transmitting and receiving information. In one embodiment, transmitter assembly 12 comprises a plurality of independent pairs of optical sources and associated modulators. Alternatively, transmitter assembly 12 could comprise one or more optical sources capable of generating a plurality of optical signals and shared by a plurality of modulators. For example, transmitter assembly 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, signal splitter receives the continuum and separates the continuum into individual signals each having a center wavelength. In some embodiments, transmitter assembly 12 can also include a pulse rate multiplexer, such as a time division multiplexer, operable to multiplex pulses received from the mode locked source or the modulator to increase the bit rate of the system.

Transmitters 12 in system 10 comprise devices capable of converting an electrical signal into an optical wavelength. Transmitters 12 can receive electrical signals generated, for example, by source devices initiating communications. In other examples, transmitters 12 could receive electrical signals from receivers associated with transmitters 12. In that case, transmitters 12 and their associated receivers could serve as optical regenerators residing within a multiple link communication system.

In the illustrated embodiment, at least one transmitter 12a comprises an electro-absorption modulated laser (EML). Others of transmitters 12 could comprise EMLs or may comprise other optical sources, such as other externally modulated light sources, or directly modulated light sources. In this embodiment, EML 12a comprises a laser diode and an electro-absorption modulator (EAM) located on a common substrate. Locating the laser diode and the EAM on a common substrate is advantageous in allowing relatively inexpensive packaging of EMLs by facilitating formation of arrays of EMLs. In some embodiments, transmitter 12a may comprise an EML with forward error correction (FEC) capabilities. Using an FEC technique in system 10 provides an advantage of improving the system's tolerance to errors in optical signal 15a. EMLs 12 can modulate information onto optical signals at rates of up to 9.5 gigahertz per second or more.

In the illustrated embodiment, system 10 also includes a combiner 14 operable to receive a plurality of optical signals 15a–15a and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over an optical communication medium 20. Communication medium 20 can comprise a plurality of spans 20a–20n of fiber, each coupled to or comprising an optical amplifier. In some embodiments all or a portion of a span can serve as a distributed amplification stage. Fiber spans 20a–20n could comprise standard single mode fiber (SMF), dispersion-shifted fiber (DSF), non-zero dispersion-shifted fiber (NZDSF), dispersion compensating fiber (DCF), or another fiber type or combination of fiber types.

Two or more spans of communication medium 20 can collectively form an optical link. In the illustrated example, communication medium 20 includes a single optical link 25 comprising numerous spans 20a–20n. System 10 could include any number of additional links coupled to link 25. For example, optical link 25 could comprise one optical link of a multiple link system, where each link is coupled to other links through optical regenerators.

In the illustrated embodiment, system 10 comprises an optical system that communicates signal 16 over optical link 25 a link distance 30. In various embodiments, link distance 30 can comprise a distance up to, for example, 200 or 300 kilometers. In other embodiments, link distance 30 could comprise greater than 300 kilometers, say, up to 500 kilometers, 800 kilometers, or 1200 kilometers or more.

In this example, system 10 includes a booster amplifier 18 operable to receive and amplify wavelengths of signal 16 in preparation for transmission over a communication medium 20. Where communication system 10 includes a plurality of fiber spans 20a–20n, system 10 can also include one or more in-line amplifiers 22a-22n. In-line amplifiers 22 couple to one or more spans 20a–20n and operate to amplify signal 16 as it traverses communication medium 20. Optical communication system 10 can also include a preamplifier 24 operable to amplify signal 16 received from a final fiber span 20n. Although optical link 25 is shown to include one or more booster amplifiers 18, in-line amplifiers, and preamplifiers 24, one or more of the amplifier types could be eliminated in other embodiments.

Throughout this document, the term "amplifier" denotes a device or combination of devices operable to at least partially compensate for at least some of the losses incurred by signals while traversing all or a portion of optical link 25. Likewise, the term "amplification" refers to offsetting at least a portion of losses that would otherwise be incurred.

An amplifier may, or may not impart a net gain to a signal being amplified. Moreover, the term "gain" as used throughout this document, does not (unless explicitly specified) require a net gain. In other words, it is not necessary that a signal experiencing "gain" or "amplification" in an amplifier stage experiences enough gain to overcome all losses in the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission filter.

Amplifiers 18, 22, and 24 could each comprise, for example, a discrete Raman amplifier, a distributed Raman amplifier, a rare earth doped amplifier such as an erbium doped or thulium doped amplifier, a semiconductor amplifier or a combination of these or other amplifier types. Amplifiers 18, 22, and 24 may provide single stage or multiple stage amplification as desired.

In some embodiments, multiple wavelength signal 16 can carry wavelength signals 15a–15a ranging across a relatively wide bandwidth. In some implementations, wavelength signals 15a–15a may even range across different communications bands (e.g., the short band (S-band), the conventional band (C-band), and/or the long band (L-band)). Depending on the amplifier types chosen, one or more of amplifiers 18, 22, and/or 24 could comprise a wide band amplifier operable to amplify all signal wavelengths 15a–15a received.

Alternatively, one or more of those amplifiers could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of groups of wavelengths prior to combining or recombining the wavelengths for communication through system 10.

An example amount of gain that may be provided by a Raman amplifier is 5 dB and an efficiency noise figure of less than 8 dB.

System 10 may further include one or more access elements. For example, the access element could comprise an optical add/drop multiplexer, a cross-connect, or another device operable to terminate, cross-connect, switch, route, process, and/or provide access to and from optical link 25 and another optical link or communication device. System 10 may also include one or more lossy elements coupled between spans 20 of link 25. For example, the lossy element could comprise an isolator, a dispersion compensating element, or a gain equalizer.

System 10 also includes a separator 26 operable to separate individual optical signal 15a–15a from multiple wavelength signal 16. Separator 26 can communicate individual signal wavelengths or ranges of wavelengths to a bank of receivers 28 and/or other optical communication paths. Separator 26 may comprise, for example, a wavelength division demultiplexer (WDM).

Cost optimization of optical communication systems typically depends on several factors, including a cost associated with system components, a system communication speed, and a communication distance associated with the optical signal. To reduce the system cost, other approaches have focused on increasing the speed of communication or increasing the distance communicated by the system. These approaches have typically not addressed the component costs as a way of reducing the cost of optical communication.

The cost associated with system components typically depends, at least in part, on the cost associated with terminals. In some embodiments, the costs associated with the terminals may comprise approximately 80% of the system component cost. The terminal cost typically depends, at least in part, on a cost associated with transmitters 12. Therefore, reducing the costs associated with transmitters 12, while maintaining a minimum level of system performance can reduce the cost of optical communication.

Conventional optical communication systems have often used transmitters that rely on external lithium niobate modulators to encode information onto an optical signal. While external lithium niobate modulators provide good performance characteristics, they are expensive. Conventional system designers have been reluctant to use anything other than lithium niobate modulators, as the focus has been on increasing speed and distance, not on reducing the costs of terminal components.

One aspect of this disclosure recognizes that system costs can be reduced by using less expensive terminal components, and that system performance can be maintained by implementing compensation techniques in combination with the less expensive terminal components. An example of a relatively inexpensive terminal component is an electro absorption modulator (EAM). Utilization of an EAM facilitates the co-location of a laser diode and the EAM on a common substrate. In other words, utilization of an EAM enables the formation of an EML. The formation of an EML provides the advantages of reducing the foot print area of the transmitter and enabling the formation of arrays of EML transmitters on a common substrate. In addition, the formation of arrays of EML transmitters reduces the cost associated with packaging a transmitter capable of supporting a WDM system. Further, the EAM provides the advantages of reducing modulator drive voltage and enables the system to support high modulation frequencies (e.g., greater than 9.5 gigabits per second).

Conventional communication system designs must take into account the known limitations of EAMs. These limitations include a relatively low extinction ratio, a low output power, and a relatively high chirp. Chirp typically results when the optical wavelength varies slightly as the pulse is being modulated by the EAM modulator. Chirp can cause the pulse to have a slightly different optical wavelength across its width. This can cause the pulse to broaden or narrow as it is communicated across the optical communication system. Chirp typically results in linear penalties (such as arising from chromatic dispersion) as well as non-linear penalties. These penalties become increasingly evident as modulation rates increase. In many systems, dispersion penalties can become significant at modulation rates as low as 9.5 gigabits per second.

The present disclosure contemplates the use of dispersion management techniques to compensate for at least a portion of the linear penalties of EML chirp. In addition, the present disclosure contemplates the use of Raman amplifiers to compensate for the for losses introduced into the system by the dispersion management techniques and to optionally introduce additional gain to the signals traversing the optical communication link.

FIGS. 2 though 4 are block diagrams showing example embodiments of dispersion compensation techniques. In various embodiments, system 10 may include one or more of the dispersion compensation techniques described below. These example embodiments contemplate utilizing any dispersion compensation device, such as a fiber having a negative slope of dispersion, a dispersion compensating fiber, a chirped Bragg grating, bulk optics, higher-order mode fiber, interferometric devices, a Gires-Tournois interferometer, a virtually imaged phased array, or another dispersion compensating device, to achieve dispersion management.

In each embodiment, the dispersion compensating element is coupled to (directly or indirectly) or comprises a part of a Raman amplification stage. The Raman amplification stage is operable to offset at least some losses induced by the dispersion compensating element. In some cases, the Raman amplification stage may impart a net gain to the signals passing through.

FIGS. 2A–E are block diagrams showing example embodiments of pre-compensation dispersion management techniques. As used throughout this document, the term "pre-compensation" refers to a dispersion management technique implemented within system 10 between one or more transmitters 12 and first fiber span 20a. These examples assume transmission of a multiple wavelength signal 16. However, similar concepts apply to transmission of even one optical wavelength signal.

In these examples, each pre-compensation system includes at least one dispersion compensation element operable to at least partially compensate for chirp induced by EMLs used to generate signal 16. In these examples, though not necessary, dispersion compensation elements are desirably depicted as a length of dispersion compensating fiber having a slope of dispersion that is approximately equal to and opposite from the slope of the chromatic dispersion associated with multiple wavelength signal 16. Although these example embodiments use dispersion compensating fiber as the dispersion compensation element, other dispersion compensation elements can be used without departing from the scope of the present disclosure.

Implementing dispersion compensating fiber as a dispersion compensating element can provide an advantage of actually using all or a portion of the dispersion compensating element as at least a portion of the amplifier gain medium. In this manner, a single element can at least partially compensate for chirp of the EMLs, while also serving as a gain medium facilitating amplification to offset any losses induced by the dispersion compensating fiber and to optionally introduce additional gain to the optical signals being processed.

FIG. 2A is a block diagram showing one example of pre-compensation system 300 implementing dispersion compensation element 310. In this example, pre-compensation system 300 includes a signal combiner 314 operable to receive plurality of optical signals 315a–315a and to combine those signals into a multiple wavelength signal 316. The structure and function of combiner 314, can be substantially similar to combiner 14 of FIG. 1.

System 300 further includes a dispersion compensation element 310 operable to at least partially compensate for the chirp induced by EMLs used to generate signal 16. In the illustrated embodiment, dispersion compensation element 310 comprises a length of dispersion compensating fiber. Other dispersion compensation elements, such as chirped Bragg grating, bulk optics, higher-order mode fiber, or interferometric devices could likewise be used.

In this example, system 300 also includes a booster amplifier 318 operable to amplify signal 316 received from element 310 in preparation for communication across communications medium 320. In this example, amplifier 318 includes at least one Raman amplification stage operable to offset losses induced by dispersion compensating element 310, and to optionally introduce additional gain into the optical signal traversing the amplifier. In one particular embodiment, at least a portion of the Raman amplifier stage's gain medium comprises a length of dispersion compensating fiber.

In operation, signal combiner 314 combines optical signals 315 into a multiple wavelength signal 316. Dispersion compensation element 310 simultaneously applies the same dispersion compensation to all or most of the wavelengths of signal 316. Dispersion compensation element 310 at least partially compensates for chirp induced by the EMLs used to generate signal 316. Amplifier 318 at least partially offsets losses induced by dispersion compensating element 310, and could optionally introduce additional gain to signal 316.

FIG. 2B is a block diagram showing another example of pre-compensation system 305 implementing parallel-paths of dispersion compensation devices. In illustrated example, pre-compensation system 305 includes at least a first combiner 314a and a second combiner 314n. Although this example shows two signal combiners 314a and 314n, any number of additional signal combiners could be used without departing from the scope of the present disclosure. Combiner 314a operates to receive a first plurality of optical signals 315a–315m and to combine those signals into a first multiple wavelength signal 330a. In a similar manner, second combiner 314n operates to receive a second plurality of optical signals $315_{m+1}$–315n and to combine those signals into a second multiple wavelength signal 330n. The structure and function of each of combiners 314a and 314n, can be substantially similar to combiner 14 of FIG. 1. In this particular embodiment, combiners 314a and 314b comprise wavelength division multiplexers.

In the illustrated example, system 305 also includes at least a first dispersion compensation element 310a and a second dispersion compensation element 310n. Although this example shows two dispersion compensation elements 310a and 310n, any number of additional dispersion compensation elements could be used without departing from the scope of the present disclosure. Element 310a operates to receive first multiple wavelength signal 330a and at least partially compensates for a chirp induced by the EMLs used to generate signal 330a. In a similar manner, element 310n operates to receive second multiple wavelength signal 330n and at least partially compensates for chirp induced by the EMLs used to generate signal 330n.

In the illustrated example, system 305 also includes at least a first booster amplifier 318a and a second booster amplifier 318n. Although this example shows two booster amplifiers 318a and 318n, any number of additional booster amplifiers could be used without departing from the scope of the present disclosure. Amplifier 318a operates to receive and amplify signal 330a. In a similar manner, amplifier 318n operates to receive and amplify signal 330n. Amplifiers 318 comprise at least one Raman amplification stage operable to offset losses induced by dispersion compensating elements 310 and to optionally introduce additional gain into the optical signal traversing the amplifiers.

In the illustrated example, system 305 also includes a combiner device 313 operable to combine compensated signals 330a and 330n into multiple wavelength signal 316 for transmission over communication link 320. The structure and function of combiner 313 can be substantially similar to combiner 14 of FIG. 1. In this particular embodiment, combiner 313 comprises wavelength division multiplexers.

In operation, pre-compensation system 305 comprises parallel paths of compensation elements and parallel booster amplifiers. Implementing parallel paths of dispersion compensation elements in pre-compensation system 305 is advantageous in enabling the application of different dispersion compensation profiles to different groups of optical wavelengths.

FIG. 2C is a block diagram showing another example of pre-compensation system 311 implementing parallel pre-compensation techniques within signal combiner 114. In this example, signal combiner 114 operates to receive optical signals 315a–315n, to compensate for a chirp induced by the EMLs used to generate signal 315a–315n, and to combine those compensated signals into a multiple wavelength signal 316. In that example, pre-compensation system 311 further includes booster amplifier 318 operable to amplify signal 316 received from combiner 114 in preparation for communication across communications medium 320. Amplifier 318 includes at least one Raman amplification stage operable to at least partially offset losses induced by dispersion compensating element 310. In one particular embodiment, at least a portion of the Raman amplifier stage's gain medium comprises a length of dispersion compensating fiber.

In the illustrated example, combiner 114 includes at least a first combiner 314a and a second combiner 314n. Although this example shows two signal combiners 314a and 314n, any number of additional signal combiners could be used without departing from the scope of the present disclosure. Combiner 314a operates to receive a first plurality of optical signals 315a–315m and to combine those signals into a first multiple wavelength signal 330a. In a similar manner, second combiner 314n operates to receive a second plurality of optical signals $315_{m+1}$–315n and to combine those signals into a second multiple wavelength signal 330n. The structure and function of each of combiners 314a and 314n, can be substantially similar to combiner 14 of FIG. 1. In this particular embodiment, combiners 314a and 314n comprise wavelength division multiplexers.

In the illustrated example, combiner 114 includes at least a first dispersion compensation element 310a and a second dispersion compensation element 310n. Although this example shows two dispersion compensation elements 310a and 310n, any number of additional dispersion compensation elements could be used without departing from the scope of the present disclosure. Element 310a operates to receive first multiple wavelength signal 330a and at least partially compensates for a chirp induced by the EMLs used to generate signal 330a. In a similar manner, element 310n operates to receive second multiple wavelength signal 330n and at least partially compensates for a chirp induced by the EMLs used to generate signal 330n.

In the illustrated example, combiner 114 also includes a combiner device 304, such as a WDM, operable to combine signals 330a and 330n into multiple wavelength signal 316 for transmission over communication link 320. Combiner device 304 may comprise any device capable of combining a plurality of multiple wavelength signals into a single multiple wavelength signal. For example, combiner device 304 may comprise a wavelength division multiplexer or a capacitive coupler.

In operation, pre-compensation system 311 implements parallel paths of dispersion compensation elements. In this manner, particular dispersion compensation profiles can be applied to different groups of wavelength signals 315. Using parallel path dispersion compensation elements is advantageous in providing more defined dispersion compensation profiles for given sets of wavelengths. For example, if system 10 communicates a relatively large bandwidth of optical signals, it might be desirable to use multiple dispersion compensation elements each with specific dispersion compensation profiles to affect particular groups of wavelengths.

Figure 2D:
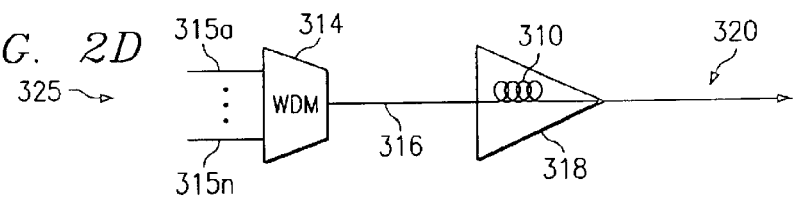

FIG. 2D is a block diagram showing another example of pre-compensation system 325 implementing a dispersion compensation technique. In this embodiment, dispersion compensation is performed within a booster amplifier 318 of pre-compensation system 325. In the illustrated embodiment, system 325 includes combiner 314 operable to receive optical signals 315a–315n and to combine those signals into multiple wavelength signal 316. The structure and function of combiner 314, can be substantially similar to combiner 14 of FIG. 1.

In the illustrated embodiment, system 325 further includes booster amplifier 318 operable to amplify signal 316 received from combiner 314 to at least offset losses incurred by the associated dispersion compensating element. In this case, booster amplifier 318 also operates to at least partially compensate for a chirp induced by the EMLs used to generate signal 316. In this example, booster amplifier 318 includes a dispersion w compensation element 310. For example, dispersion compensation element 310 could comprise a length of dispersion compensating fiber serving as a gain medium within amplifier 318. In other embodiments, dispersion compensation element 310 could comprise a length of dispersion compensating transmission fiber coupled to a gain medium of amplifier 318, or another dispersion compensating element. Where the dispersion compensating element comprises at least a portion of the Raman amplifier stage's gain medium, the dispersion compensating element can be pumped to produce Raman gain that at least partially offsets for the losses induced by dispersion compensating element 310.

Figure 2E:
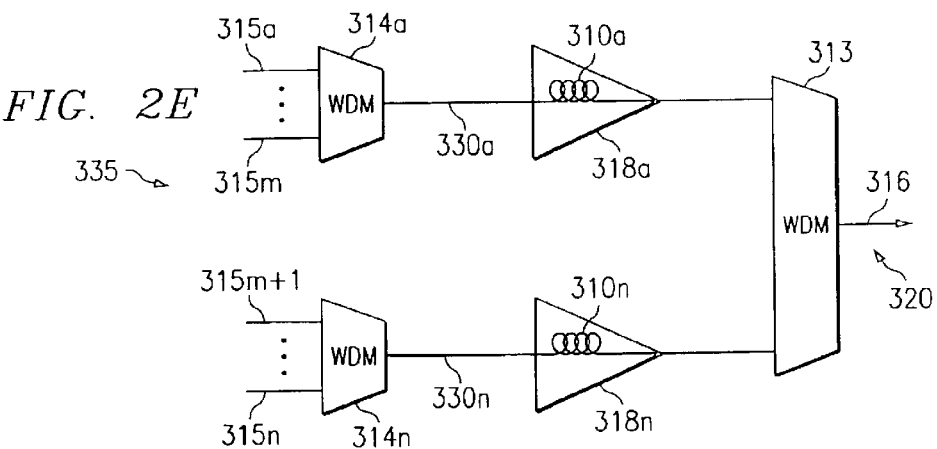

FIG. 2E is a block diagram showing another example of pre-compensation system 335 implementing parallel combinations of booster amplifiers comprising dispersion compensation elements. In illustrated example, pre-compensation system 335 includes at least a first combiner 314a and a second combiner 314n. Although this example shows two signal combiners 314a and 314n, any number of additional signal combiners 314 could be used without departing from the scope of the present disclosure. Combiner 314a operates to receive a first plurality of optical signals 315a–315m and to combine those signals into a multiple wavelength signal 330a. In a similar manner, second combiner 314 operates to receive a second plurality of optical signals $315_{m+1}$–315n and to combine those signals into a second multiple wavelength signal 330n. The structure and function of each of combiners 314a and 314n, can be substantially similar to combiner 14 of FIG. 1. In this particular embodiment, combiners 314a and 314n comprise wavelength division multiplexers.

In the illustrated example, system 335 also includes at least a first booster amplifier 318a and a second booster amplifier 318n. Although this example shows two booster amplifiers 318a and 318n, any number of additional booster amplifiers could be used without departing from the scope of the present disclosure. Amplifier 318a operates to receive and amplify signal 330a. In a similar manner, amplifier 318n operates to receive and amplify signal 330n. The structure and function of each of amplifiers 318a and 318n, can be substantially similar to combiner 18 of FIG. 1.

In the illustrated example, booster amplifiers 318a and 318n also operate to at least partially compensate for a chirp induced by the EMLs used to generate signals 330a and 330n, respectively. In this example, booster amplifier 318a includes a first dispersion compensation element 310a and booster amplifier 318n includes a second dispersion compensation element 310n. For example, dispersion compensation elements 310a and 310n could each comprise a length of dispersion compensating fiber serving as a gain medium within amplifiers 318a and 318n, respectively. In other embodiments, dispersion compensation elements 310 could each comprise a length of dispersion compensating transmission fiber coupled to a gain medium of amplifiers 318. In either case, the dispersion compensating fiber can be pumped to produce Raman gain sufficient to at least partially offset the losses induced by dispersion compensating fiber 310, and in some cases to provide additional gain to signals being amplified.

Although this example shows two dispersion compensation elements 310a and 310n, any number of additional dispersion compensation elements could be used without departing from the scope of the present disclosure. Element 310a operates to receive first multiple wavelength signal 330a and at least partially compensates for a chirp induced by the EMLs used to generate signal 330a. In a similar manner, element 310n operates to receive second multiple wavelength signal 330n and at least partially compensates for a chirp induced by the EMLs used to generate signal 330n.

In the illustrated example, system 335 also includes a combiner device 313 operable to combine signals 330a and 330n into multiple wavelength signal 316 for transmission over communication link 320. The structure and function of combiner 313 can be substantially similar to combiner 14 of FIG. 1. In this particular embodiment, combiner 313 comprises wavelength division multiplexers.

FIGS. 3A–D are block diagrams showing example embodiments of post-compensation dispersion management techniques. As used throughout this document, the term "post-compensation" refers to a dispersion management technique implemented within system 10 between final fiber span 20n and receivers 28. In these examples, each post-compensation system includes at least one dispersion compensation element operable to at least partially compensate for chirp induced by EMLs used to generate signal 16.

In these examples, dispersion compensation elements are depicted as a length of dispersion compensating fiber having a slope of dispersion that is approximately equal to and opposite from the slope of the chromatic dispersion associated with multiple wavelength signal 16. Though desirable, such a characteristic is not needed for proper operation. Although these example embodiments use dispersion compensating fiber as the dispersion compensating element, other dispersion compensating elements could be used without departing from the scope of the present disclosure.

Regardless of the dispersion compensating element utilized, each post-compensation assembly shown in FIGS. 3A–3D includes an amplifier comprising at least one Raman amplification stage operable to offset losses induced by the dispersion compensating element and, in some instances, provide additional gain to the optical signals being communicated.

Implementing dispersion compensating fiber as a dispersion compensating element can provide an advantage of actually using all or a portion of the dispersion compensating element as at least a portion of the Raman amplifier gain medium. In this manner, a single element can at least partially compensate for chirp of the EMLS, while also serving as a gain medium facilitating amplification to offset any losses induced by the dispersion compensating fiber and to, in some cases, introduce additional gain to the optical signals being processed.

Figure 3A:
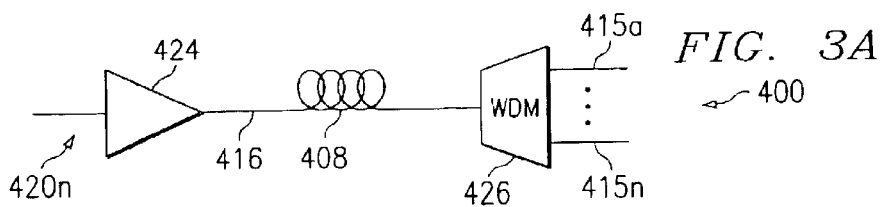
FIGS. 3A–D illustrate example dispersion compensation implementations at a pre-amplifier of the fiber optic transmission system.

FIG. 3A is a block diagram showing one example of a post-compensation system 400 implementing a dispersion compensating element 408 between final fiber span 420n and receiver 428. In this example, post-compensation system 400 includes a preamplifier 424 operable to amplify signal 416 received from a final fiber span 420n. The structure and function of preamplifier 424, can be substantially similar to preamplifier 24 of FIG. 1.

Post-compensation system 400 further includes a dispersion compensation element 408 coupled to preamplifier 424 and operable to at least partially compensate a chirp induced by the EMLs used to generate signal 416. In the illustrated embodiment, system 400 also includes a separator 426 operable to separate individual optical signals 415a–415n from multiple wavelength signal 416. The structure and function of separator 426, can be substantially similar to separator 26 of FIG. 1.

In operation, preamplifier 424 receives multiple wavelength signal 416 and propagates that signal toward dispersion compensation element 408. Dispersion compensation element 408 at least partially counteracts a chirp induced by the EMLs used to generate signal 416 prior to signal 416 entering separator 426.

Figure 3B:
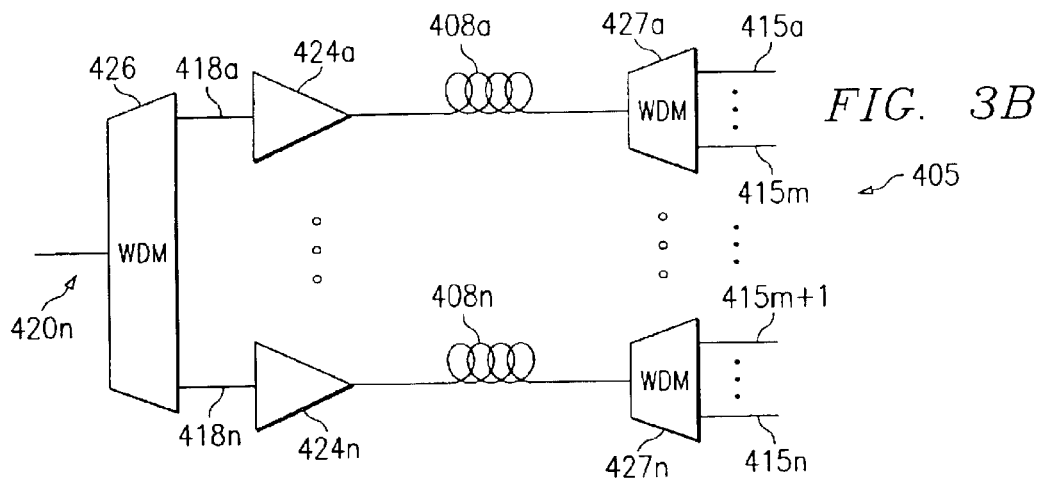

FIG. 3B is a block diagram showing another example of post-compensation system 405 implementing a parallel combination of pre-amplifiers 424 and dispersion compensation elements 408. In the illustrated example, system 405 includes a separator 426 operable to receive multiple wavelength signal 416 from final fiber span 420n and to separate signal 416 into at least a first multiple wavelength signal 418a and a second multiple wavelength signal 418n. The structure and function of separator 426 can be substantially similar to separator 26 of FIG. 1.

In the illustrated example, system 405 also includes at least a first preamplifier 424a and a second preamplifier 424n. Although this example shows two preamplifiers 424a and 424n, any number of additional preamplifiers could be used without departing from the scope of the present disclosure. Preamplifier 424a operates to receive and amplify signal 418a, while preamplifier 424n operates to receive and amplify signal 418n. The structure and function of each of preamplifiers 424a and 424n, can be substantially similar to preamplifier 24 of FIG. 1.

In the illustrated example, system 405 also includes at least a first dispersion compensation element 408a and a second dispersion compensation element 408n. Although this example shows two dispersion compensation elements 408a and 408n, any number of additional dispersion compensation elements could be used without departing from the scope of the present disclosure. Element 408a operates to receive first multiple wavelength signal 418a and at least partially compensates a chirp induced by the EMLs used to generate signal 418a. In a similar manner, element 408n operates to receive second multiple wavelength signal 418n and at least partially compensates for a chirp induced by the EMLs used to generate signal 418n.

System 405 further includes at least a first separator 427a and a second separator 427n. Although this example shows two separators 427a and 427n, any number of additional separators could be used without departing from the scope of the present disclosure. Separator 427a separates individual optical signals 415a–415m from first multiple wavelength signal 418a, while separator 427n separates individual optical signals $415_{m+1}$–415n from second multiple wavelength signal 418n. The structure and function of each of separators 427a and 427n, can be substantially similar to separator 26 of FIG. 1.

Separating multiple wavelength signal 416 into multiple wavelength signals 418a and 418n enables the formation of parallel paths of dispersion compensation within post-compensation system 405. Implementing parallel paths of dispersion compensation in post-compensation system 405 is advantageous in enabling the application of different compensation profiles to different sets of optical wavelengths within multiple wavelength signal 416.

Figure 3C:
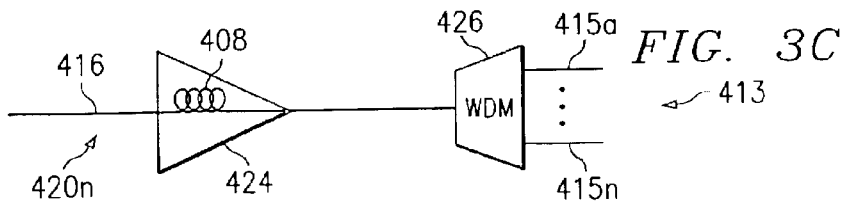

FIG. 3C is a block diagram showing another example of a post-compensation system 413 implementing dispersion compensation element 408 within preamplifier 424. In this example, post-compensation system 413 includes preamplifier 424 operable to amplify multiple wavelength signal 416 received from final fiber span 420n and to at least partially compensate for a chirp induced by the EMLs used to generate signal 416. The structure and function of preamplifier 424, can be substantially similar to preamplifier 24 of FIG. 1.

In this example, pre-amplifier 424 includes dispersion compensation element 408. For example, dispersion compensation element 408 could comprise a length of dispersion compensating fiber serving as a gain medium within preamplifier 424. In other embodiments, dispersion compensation element 408 could comprise a length of dispersion compensating fiber coupled to a gain medium of pre-amplifier 424.

System 413 further includes separator 426 operable to separate multiple wavelength signal 416 into individual optical signals 415a–415a. The structure and function of separator 426, can be substantially similar to separator 26 of FIG. 1.

Figure 3D:
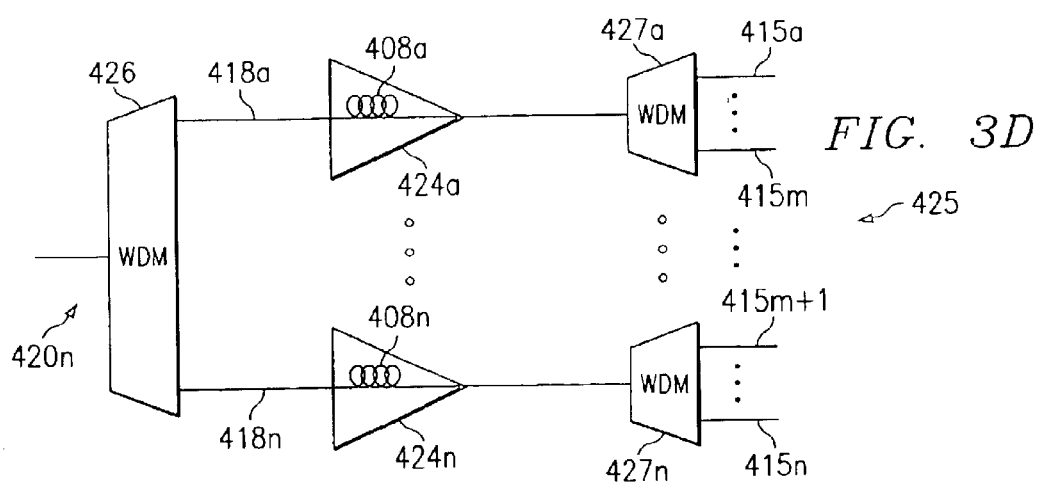

FIG. 3D is a block diagram showing another example of post-compensation system 425 implementing parallel-paths of booster amplifiers, each comprising dispersion compensation elements. In the illustrated example, system 425 includes a separator 426 operable to receive multiple wavelength signal 416 from final fiber span 420n and to separate signal 416 into at least a first multiple wavelength signal 418a and a second multiple wavelength signal 418n. The structure and function of separator 426 can be substantially similar to separator 26 of FIG. 1.

In the illustrated example, system 425 also includes at least a first preamplifier 424a and a second preamplifier 424n. Although this example shows two preamplifiers 424a and 424n, any number of additional preamplifiers could be used without departing from the scope of the present disclosure. Preamplifier 424a operates to receive and amplify first multiple wavelength signal 418a, while preamplifier 424n operates to receive and amplify second multiple wavelength signal 418n. The structure and function of each of preamplifiers 424a and 424n, can be substantially similar to preamplifier 24 of FIG. 1.

In this example, preamplifiers 424a and 424n also operate to at least partially compensate for a chirp induced by the EMLs used to generate signals 418a and 418n, respectively. In this example, preamplifier 424a includes a first dispersion compensation element 408a and preamplifier 424n includes a second dispersion compensation element 408n. For example, dispersion compensation elements 408a and 408n could each comprise a length of dispersion compensating fiber serving as a gain medium within preamplifiers 424a and 424n, respectively. In other embodiments, dispersion compensation elements 408 could each comprise a length of dispersion compensating transmission fiber coupled to a gain medium of preamplifiers 424. Although this example shows two dispersion compensation elements 408a and 408n, any number of additional dispersion compensation elements could be used without departing from the scope of the present disclosure. Element 408a operates to receive first multiple wavelength signal 418a and at least partially compensates for a chirp induced by the EMLs used to generate signal 418a. In a similar manner, element 408n operates to receive second multiple wavelength signal 418n and at least partially compensates for a chirp induced by the EMLs used to generate signal 418n.

System 425 further includes at least a first separator 427a and a second separator 427n. Although this example shows two separators 427a and 427n, any number of additional separators could be used without departing from the scope of the present disclosure. Separator 427a separates individual optical signals 415a–415m from signal 418a, while separator 427n separates individual optical signals $415_{m+1}$–415n from signal 418n. The structure and function of each of separators 427a and 427n, can be substantially similar to separator 26 of FIG. 1.

Separating multiple wavelength signal 416 into signal 418a and signal 418n enables the formation of parallel paths of dispersion compensation within post-compensation system 425. Implementing parallel paths of dispersion compensation in post-compensation system 425 is advantageous in enabling the application of different compensation profiles to different sets of optical wavelengths within multiple wavelength signal 416.

Figure 4A:
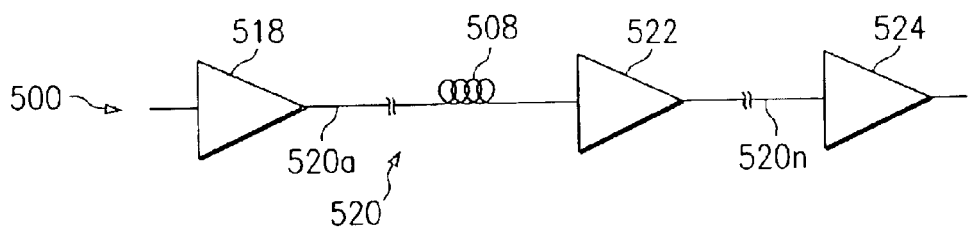
FIGS. 4A–C illustrate example dispersion compensation implementations at an in-line amplifier of the fiber optic transmission system.
Figure 4B:
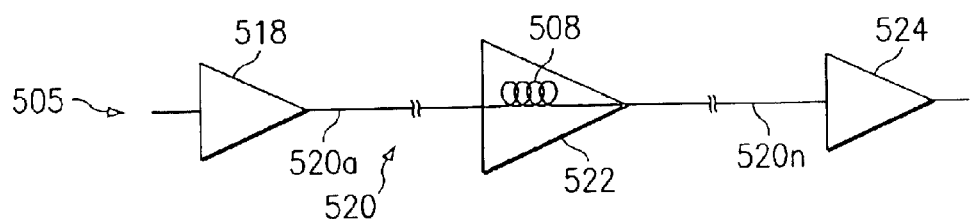
Figure 4C:
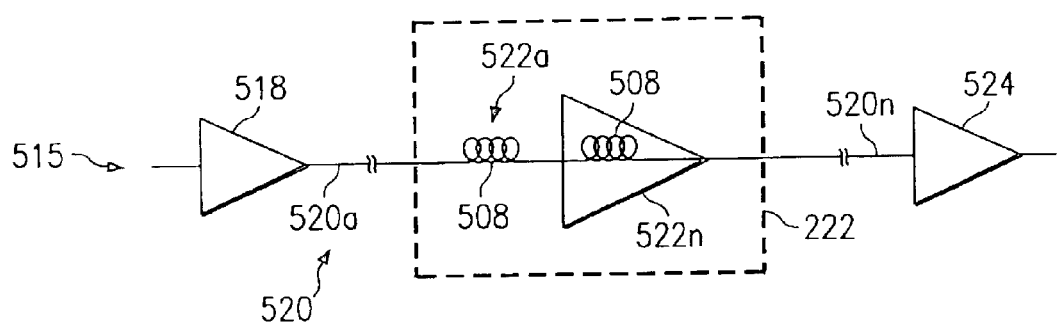

FIGS. 4A–C are block diagrams showing example embodiments of in-line dispersion management techniques. As used throughout this document the term "in-line dispersion management" refers to a dispersion management technique implemented within system 10 between spans 20 of optical link 25. In these examples, each in-line compensation system includes at least one dispersion compensation element operable to at least partially compensate for chirp induced by the EML's generating signal 16. In these examples, dispersion compensating elements are depicted as a length of dispersion compensating fiber having a slope of dispersion that is equal to and opposite from the slope of chromatic dispersion associated with multiple wavelength signal 16. Although these example embodiments use dispersion compensating fiber as dispersion compensating element, other dispersion compensation elements can be used. Though desirable, such a characteristic is not needed for proper operation.

Regardless of the dispersion compensating element utilized, each in-line assembly shown in FIGS. 4A–4C includes an amplifier comprising at least one Raman amplification stage operable to offset losses induced by the dispersion compensating element and, in some instances, provide additional gain to the optical signals being communicated.

Implementing dispersion compensating fiber as a dispersion compensating element can provide an advantage of actually using all or a portion of the dispersion compensating element as at least a portion of the amplifier gain medium. In this manner, a single element can at least partially compensate for chirp of the EMLs, while also serving as a gain medium facilitating amplification to offset any losses induced by the dispersion compensating fiber.

FIG. 4A is a block diagram showing one example of an in-line compensation system 500. In this example, in-line compensation element 508 comprises a portion of communications medium 520 residing between spans 20 of optical link 25. Where dispersion compensation element 508 comprises only a portion of communications medium 520, dispersion compensation element 508 could reside at any location along communication medium 520. In operation, dispersion compensation element 508 receives multiple wavelength signal 516 and at least partially counteracts a chirp induced by the EMLs used to generate signal 516. The structure and function of booster amplifier 518 and preamplifier 524, can be substantially similar to booster amplifier 18 and preamplifier 24 of FIG. 1, respectively.

FIG. 4B is a block diagram showing another example of in-line compensation system 505 implementing dispersion compensation element 508 within in-line amplifier 522. In this example, in-line compensation system 505 includes an in-line amplifier 522 operable to amplify signal 516 as it traverses communication medium 20. The structure and function of amplifier 522, can be substantially similar to amplifier 22 of FIG. 1.

In this embodiment, amplifier 522 also operates to at least partially compensate for a chirp induced by the EMLs used to generate signal 516. For example, dispersion compensation element 508 could comprise a length of dispersion compensating fiber serving as a gain medium within amplifier 522. In other embodiments, dispersion compensation element 508 could comprise a length of dispersion compensating transmission fiber coupled to a gain medium of amplifier 522. Although this example illustrates just one in-line amplifier 522 including dispersion compensation element 508, any additional number of in-line amplifiers with dispersion compensation elements could reside along communication medium 520.

FIG. 4C is a block diagram showing another example of in-line compensation system 515 implementing dispersion compensation element 508 within a multistage in-line amplifier 222. In this example, in-line compensation system 515 includes a multistage in-line amplifier 222 operable to amplify signal 516 as it traverses communication medium 520 and to at least partially compensate for a chirp induced by the EMLs used to generate signal 516. Although this example illustrates one multistage in-line amplifier 222, system 515 could also include a plurality of multistage in-line amplifiers 222 without departing from the scope of the present disclosure.

In the illustrated embodiment, multistage in-line amplifier 222 includes at least a first amplification stage 522a and a second amplification stage 522n. Amplification stages 522a–522n may comprise any elements capable of at least partially compensating for at least some of the losses incurred by signal 516 while traversing a portion of communications link 520. In this example, first stage 522a comprises a distributed Raman amplifier, while second stage 522n comprises a discrete Raman amplifier.

First stage 522a and/or second stage 522n can include dispersion compensation element 508. For example, all or a portion of the transmission medium of distributed first stage 522a could comprise a dispersion compensating fiber. In addition, or alternatively, all or a portion of the gain medium of second stage 522n could comprise a dispersion compensating fiber. Amplifier 222 could also comprise any number of additional amplification stages, which may or may not include dispersion compensation elements.

Though certain techniques have been shown with respect to booster amplifier, in-line amplifier, and pre-amplifier designs, a technique discussed with respect to one type of amplifier design may equally apply to other types of amplifier designs.

Figure 5:
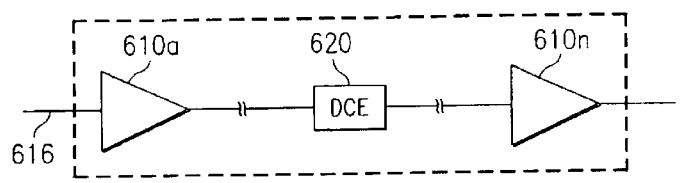
FIG. 5 is a block diagram of one example of a multiple stage amplifier comprising a dispersion compensating element residing mid-stage within the multiple stage amplifier.

FIG. 5 is a block diagram of one example of a multiple stage amplifier 600 comprising a dispersion compensating element 620 residing mid-stage within the multiple stage amplifier. In this example, multiple stage amplifier 600 comprises a plurality of amplification stages 610a–610n. Amplification stages 610 receive an optical signal 616. Optical signal 616 could comprise a single channel, or could comprise a multiple wavelength signal.

One or more of amplification stages 610 could comprise, for example, distributed Raman amplification stages; discrete Raman amplification stages; rare-earth doped amplification stages such as erbium doped fiber amplifiers and thulium doped fiber amplifiers, semiconductor optical amplifier stages, or other amplifier types or combinations of amplifier types.

In one particular embodiment, a first stage 610a could comprise a distributed Raman amplifier stage, while another stage, say 610n, comprises a discrete Raman amplifier stage. In another embodiment, one of stages 610 could comprise a Raman amplification stage, while another stage 610 comprises a rare-earth doped amplifier stage. Various other combinations are contemplated as being within the scope of this disclosure.

Multiple stage amplifier 600 includes a dispersion compensating element 620 residing between at least two stages 610 of amplifier 600. Dispersion compensating element 610 could comprise, for example, a dispersion compensating fiber, a chirped Bragg grating, bulk optics, a higher-order mode fiber, an interferometric device, a Gires-Tournois interferometer, a virtually imaged phased array, or another dispersion compensating device, to achieve dispersion management.

Dispersion compensating element 620 at least partially compensates for a distortion, such as chirp, caused by low cost transmitters, such as EMLs or continuum source transmitters. At least one amplification stage 610 comprises a Raman amplification stage operable to compensate for at least some of the losses induced by dispersion compensating element 620 and can optionally provide at least some additional gain to optical signal 616. In some cases, amplification stage 610 or amplifier 600 may impart a net gain to signal 616.

Though example dispersion management techniques have been shown, other configurations of dispersion management techniques may be implemented within system 10 with effectiveness. The dispersion provided by any of the dispersion management techniques may be positive or negative in nature. An amount of dispersion may be greater than 10 ps/nm*km in magnitude for some embodiments and may be greater than 50 ps/nm*km in other embodiments as desired. In some cases, the dispersion compensating element could comprise a fiber having a negative slope of dispersion and a magnitude of dispersion of 2 ps/nm*km or more.

Though EMLs are typically considered more for use in metropolitan area networks of, say, less than 400 or 300 km, the present disclosure contemplates the use of EMLs in any length of optical communication link 25 to include applications of greater than 500 km. A dispersion compensation element and Raman amplifier may be placed anywhere in optical communication link 25 in any optical span 20 to compensate for the chirp effect of an EML at transmitter 12 including at booster amplifier 18, in-line amplifier 22, and pre-amplifier unit 24. However, it is advantageous to implement a dispersion compensation element and a Raman amplifier at booster amplifier 18, which is closer to the chirp source of transmitter 12. There may also be multiple dispersion compensation elements with associated Raman amplification within optical communication link 25.

Figure 6:
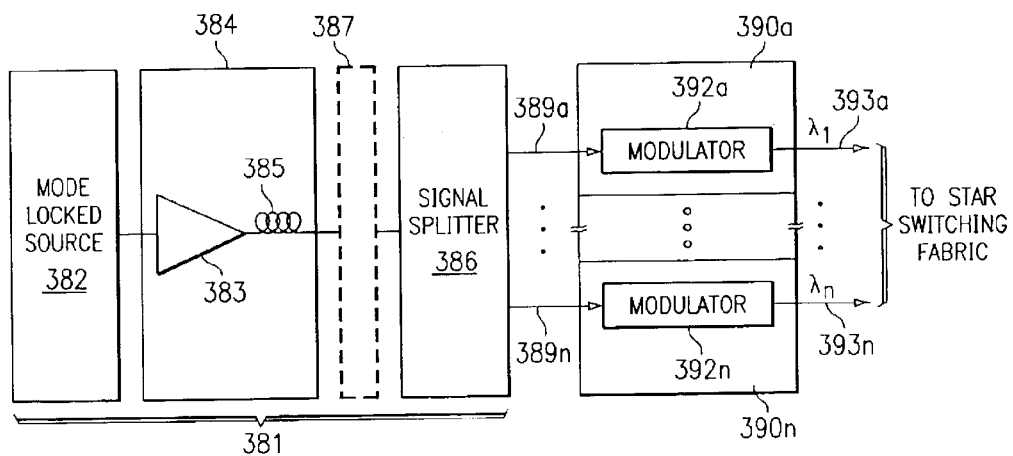
FIG. 6 is a block diagram illustrating an example embodiment of a continuum optical source for use with an optical communication system, such as that discussed in FIG. 1.

FIG. 6 is a block diagram illustrating an example embodiment of an optical transmitter system 380 for use with an optical communication system, such as that discussed in FIG. 1, which can be particularly useful in a system implementing large number of channels, for instance 64 or more channels. Optical transmitter system 380 comprises a continuum source. In a particular embodiment, system 380 could comprise a supercontinuum source. Supercontinuum generation describes extreme, nearly continuous spectral broadening induced by high-intensity picosecond and sub-picosecond pulse propagation through a nonlinear medium.

In this example, system 380 includes a modelocked source 382 operable to generate a series of optical pulses. As a particular example, modelocked source 382 could comprise an erbium doped fiber laser operable to generate pulses at a rate of, for example, forty gigabits per second. Other modelocked sources operating at other rates could likewise be used.

System 380 further includes a continuum generator 384 operable to receive a train of pulses from modelocked source 382 and to spectrally broaden the pulses to form an approximate spectral continuum of optical signals. In this example, continuum generator 384 includes an optical amplifier 383 coupled to one or more lengths of optical fiber 385. Optical amplifier 383, in this particular example, comprises an erbium doped amplifier. Other amplifier types or combinations of amplifier types could likewise be used. In this example, fiber 385 comprises a two stage solition-effect compressor including approximately two meters of standard fiber followed by approximately two meters of dispersion shifted fiber. Other lengths of fiber and fiber types could be used, depending on the spectral characteristics desired. Moreover, although this example relies on the solition effect to broaden the spectrum of the plurality of optical pulses, other pulse compression techniques, such as adiabatic solition compression, could alternatively be used.

System 380 also includes a signal splitter 386. Signal splitter 386 receives the continuum from continuum generator 384 and separates the continuum into individual signals 389a–389n each having a wavelength or a range of wavelengths. Signal splitter 386 could comprise, for example, a passive wavelength division multiplexer, a power splitter followed by fixed wavelength filters, or any other mechanism operable to separate a continuum or near continuum of signals into a plurality of individual signals.

Mode locked source 382, continuum generator 384, and signal splitter 386 can comprise common bay equipment— in other words, equipment shared by plurality of line cards 390. Where it is desired to generate a larger bandwidth of optical signals, multiple sets of common bay equipment 381 can be implemented, each set serving a separate set of line cards 390 and each generating a separate range of wavelengths.

Signal splitter 386 communicates signals 389a–389n to one of a plurality of modulators 392a–392n, respectively. Modulators 392 operate to encode information onto the optical signals received to produce optical wavelength signals 393 for transmission to a star switching fabric. In this particular example, each modulator 392 resides on a line card 390. When used with a continuum source, each of the plurality of transmitters in system 380 can be viewed as one of modulators 392 in combination with equipment, such as common bay equipment 381, used to generate the unmodulated signal received by each modulator 392.

In some embodiments, system 380 further comprises a pulse rate multiplexer 387, such as a time division multiplexer. Pulse rate multiplexer 387 operates to multiplex pulses received from mode locked source 382 to increase the bit rate of the system. Pulse rate multiplexer 387 could alternatively reside downstream from modulators 392 and operate to time division multiplex signals received from modulators 392.

In operation, modelocked source 382 generates a plurality of optical pulses at a given rate. Continuum generator 384 receives the train of pulses from modelocked source 382 and compresses those pulses to form an approximate continuum of optical signals. Signal splitter 386 receives and separates the continuum into a plurality of optical signals 389a–389n each comprising a wavelength or range of wavelengths. Each modulator 392 receives one of signals 392 from signal separator 386 and encodes information onto the optical signal received to generate signals 393 for transmission to a star switching fabric.

Transmitter system 380 can support generation of fixed wavelength signals or selectively tuned wavelength signals. To facilitate generation of selectively tuned wavelength signals, system 380 could include, for example, a signal selector 395 operable to selectively pass particular wavelength signals to particular modulators 393, depending on the wavelength signal desired to be transmitted from that modulator 393. Signal selector 395 could comprise any hardware, software, firmware, or combination thereof operable to send particular wavelength signals to particular modulators in response to, for example, a control signal generated by a scheduling engine.

System 380 provides numerous benefits over systems implementing separate optical transmitters for each channel. For example, implementing one or more common modelocked sources to generate numerous wavelength signals, saves considerable space on each line card, and reduces cost by eliminating numerous individual transmitters. Moreover, system 380 facilitates using common parts, such as modulators, for a number of different line cards serving different channels. This makes it easier to match parts to each line card. Furthermore, stabilization issues can be alleviated because system 380 allows stabilization of one or a few common transmitter elements, rather than requiring stabilization of separate transmitters each associated with one of the channels.

Although the present invention has been described in detail, it should be understood that various changes, substitutions, and alterations may be readily ascertainable by those skilled in the art. For example, the present invention applies equally as well with respect to unidirectional or bi-directional transmission systems. Also, either co-propagating or counter-propagating laser pumping for Raman amplification may be implemented. Different dispersion compensation may be included for each wavelength in the fiber optic transmission system. Other examples may be readily ascertainable by those skilled in the art and may be made herein without departing from the spirit and scope of the present invention as defined by the following claims.

What is claimed is:

1. A fiber optic transmission system with transmitter compensation, comprising:
   an electro-absorption modulated laser formed on a single substrate, the electro-absorption modulated laser comprising a light source and an electro-absorption modulator and operable to generate an optical signal for transmission over a fiber optic communication link;
   a Raman amplifier stage coupled to the communication link, the Raman amplifier stage having a gain medium including a dispersion compensating fiber;
   wherein the dispersion compensating fiber is operable to at least partially compensate for a distortion caused by the electro-absorption modulated laser, and wherein the Raman amplifier stage is operable to at least partially compensate for a loss associated with the dispersion compensation fiber.

2. The fiber optic transmission system of claim 1, wherein the Raman amplification stage comprises a distributed Raman amplification stage.

3. The fiber optic transmission system of claim 1, wherein the Raman amplification stage comprises a discrete Raman amplification stage.

4. The fiber optic transmission system of claim 1, wherein the Raman amplification stage comprises one stage in a multiple stage amplifier.

5. The fiber optic transmission system of claim 4, wherein at least one other stage in the multiple stage amplifier comprises a second Raman amplification stage.

6. The fiber optic transmission system of claim 4, wherein at least one other stage in the multiple stage amplifier comprises a rare-earth doped amplification stage.

7. The fiber optic transmission system of claim 1, wherein an amplifier comprising the Raman amplifier stage is operable to introduce a net gain in the dispersion compensating fiber to the optical signal.

8. The fiber optic transmission system of claim 7 wherein the net gain is 5 decibels.

9. The fiber optic transmission system of claim 1, wherein an amplifier comprising the Raman amplifier stage comprises an effective noise figure less than eight (8) decibels.

10. The fiber optic transmission system of claim 1, wherein the dispersion compensating fiber comprises a negative sign of dispersion.

11. The fiber optic transmission system of claim 1, wherein the dispersion compensating fiber provides a positive sign of dispersion.

12. The fiber optic transmission system of claim 1, wherein the dispersion compensation element has a magnitude of dispersion greater than 10 ps/m*km.

13. The fiber optic transmission system of claim 1, wherein the dispersion compensation element has a magnitude of dispersion greater than 50 ps/m*km.

14. The fiber optic transmission system of claim 1, wherein the fiber optic communication link includes a plurality of optical spans, at least one of the plurality of optical spans having the dispersion compensating fiber.

15. The fiber optic transmission system of claim 1, wherein the Raman amplifier is part of a booster amplifier on the fiber optic communication link.

16. The fiber optic transmission system of claim 1, wherein the Raman amplifier is part of an in-line amplifier on the fiber optic communication link.

17. The fiber optic transmission system of claim 1, wherein the Raman amplifier is part of a pre-amplifier on the fiber optic communication link.

18. The fiber optic transmission system of claim 1, wherein the fiber optic communication link is greater than 300 kilometers in length between any optical regenerators.

19. The fiber optic transmission system of claim 1, wherein the fiber optic communication link is less than 300 kilometers in length.

20. The fiber optic transmission system of claim 1, wherein the distortion of the optical signal caused by the electro-absorption modulated laser comprises a chirp.

21. The fiber optic transmission system of claim 1, wherein the distortion of the optical signal caused by the electro-absorption modulated laser comprises a low output power resulting from the EML having a modulator and a light source on a common substrate.

22. The fiber optic transmission system of claim 21, wherein the output power of the EML into the communication link is less than ten (10) milli-watts.

23. The fiber optic transmission system of claim 1, wherein the electro-absorption modulated laser modulates information onto the optical signal at a rate of at least 9.5 gigabits per second.

24. The fiber optic transmission system of claim 1, wherein the Raman amplifier stage resides within a multiple stage amplifier and wherein the multiple stage amplifier further comprises a rare-earth amplification stage.

25. A method for compensating transmitter signal distortion, comprising:
receiving from a communication link at a Raman amplification stage comprising a dispersion compensating fiber serving as at least a portion of a gain medium, an optical signal generated using an electro-absorption modulated laser formed on a single substrate, the electro-absorption modulated laser comprising a light source and an electro-absorption modulator, the optical signal having a distortion caused by the laser;
performing dispersion compensation in the Raman amplification stage to at least partially compensate for the distortion caused by the electro-absorption modulated laser;
performing amplification in the Raman amplification stage to compensate for a loss introduced by the dispersion compensation and to provide additional gain for the optical signal.

26. The method of claim 25, wherein the Raman amplification stage comprises a distributed Raman amplification stage.

27. The method of claim 25, wherein the Raman amplification stage comprises a discrete Raman amplification stage.

28. The method of claim 25, wherein the Raman amplification stage comprises one stage in a multiple stage amplifier.

29. The method of claim 28, wherein at least one other stage in the multiple stage amplifier comprises a second Raman amplification stage.

30. The method of claim 28, wherein at least one other stage in the multiple stage amplifier comprises a rare-earth doped amplification stage.

31. The method of claim 25, wherein performing Raman amplification comprises introducing a net gain in the dispersion compensating fiber to the optical signal.

32. The method of claim 25, wherein the dispersion compensation performed has a negative slope of dispersion.

33. The method of claim 25, wherein the dispersion compensation performed has a positive slope of dispersion.

34. The method of claim 25, wherein the dispersion compensation performed has a magnitude of dispersion greater than 10 ps/nm*km.

35. The method of claim 25, wherein the fiber optic communication link includes a plurality of optical spans, at least one of the plurality of optical spans performing the dispersion compensation.

36. The method of claim 25, wherein the fiber optic communication link is greater than 300 kilometers in length between any optical regenerators.

37. The method of claim 25, wherein the fiber optic communication link is less than 300 kilometers in length.

38. The method of claim 25, wherein the distortion of the optical signal caused by the electro-absorption modulated laser comprises a chirp.

39. The method of claim 25, wherein the distortion of the optical signal caused by the electro-absorption modulated laser comprises a low output power resulting from the EML having a modulator and a light source on a common substrate.

40. The method of claim 39, wherein the output power of the EML into the communication link is less than ten (10) milli-watts.

41. The method of claim 25, further comprising:
generating the optical signal using an electro-absorption modulated laser; and
communicating the optical signal to the fiber optic communication link.

42. The method of claim 25, wherein the optical signal comprises a bit rate of at a rate of at least 9.5 gigabits per second.

43. A fiber optic transmission system for low-cost transmitter compensation, comprising:
a plurality of transmitters operable to generate a plurality of optical signals, at least one of the plurality of transmitters including an electro-absorption modulated laser comprising a light source and an electro-absorption modulator, the electro-absorption modulated laser operable to generate an optical signal having a distortion associated therewith;
a combiner operable to combine the plurality of optical signals into a wavelength division multiplexed multiple wavelength signal for communication to a fiber optic communication link;
a Raman amplifier stage coupled to the fiber optic communication link, the Raman amplifier having a gain medium including a dispersion compensation fiber;
wherein the dispersion compensation fiber is operable to at least partially compensate for the distortion in the optical signal from the electro-absorption modulated laser, the Raman amplifier stage operable to at least partially compensate for a loss associated with the dispersion compensation fiber.

44. The fiber optic transmission system of claim 43, wherein the Raman amplifier stage is part of a booster amplifier coupled to the combiner.

45. The fiber optic transmission system of claim 43, further comprising:
a plurality of receivers operable to receive the optical signals from the fiber optic communications link.

46. The fiber optic transmission system of claim 45, further comprising:
a demultiplexer operable to selectively provide the optical signals to the plurality of receivers.

47. The fiber optic transmission system of claim 46, wherein the Raman amplifier stage is part of a pre-amplifier coupled to the demultiplexer.

48. The fiber optic transmission system of claim 43, wherein the Raman amplifier stage is part of an in-line amplifier on the fiber optic transmission link.

49. The fiber optic transmission system of claim 43, wherein the dispersion compensation fiber has a magnitude of dispersion greater than 10 ps/nm*km.

50. The fiber optic transmission system of claim 43, wherein the dispersion compensation fiber has a negative sign of dispersion.

51. The fiber optic transmission system of claim 43, wherein the dispersion compensation fiber has a magnitude of dispersion greater than 50 ps/nm*km.

52. A fiber optic transmission system with transmitter compensation, comprising:

an electro-absorption modulated laser formed on a single substrate, the electro-absorption modulated laser comprising a light source and an electro-absorption modulator and operable to generate an optical signal for transmission over a fiber optic communication link;

a Raman amplifier stage coupled to the communication link, the Raman amplifier stage comprising a gain medium having a negative sign of dispersion;

wherein the gain medium is operable to at least partially compensate for a chirp caused by the electro-absorption modulated laser, and wherein the Raman amplifier stage is operable to at least partially compensate for a loss associated with the gain medium.

53. The fiber optic transmission system of claim 52, the Raman amplifier stage is operable to introduce a net gain in the dispersion compensating fiber to the optical signal.

54. The fiber optic transmission system of claim 53 wherein the net gain is 5 decibels.

55. The fiber optic transmission system of claim 52, wherein an amplifier comprising the Raman amplifier stage comprises an effective noise figure less than eight (8) decibels.

56. The fiber optic transmission system of claim 52, wherein the dispersion compensation element has a magnitude of dispersion greater than 2 ps/nm*km.

57. The fiber optic transmission system of claim 52, wherein the dispersion compensation element has a magnitude of dispersion greater than 5 ps/nm*km.

58. The fiber optic transmission system of claim 52, wherein the fiber optic communication link includes a plurality of optical spans.

59. The fiber optic transmission system of claim 52, wherein the fiber optic communication link is greater than 300 kilometers in length between any optical regenerators.

60. The fiber optic transmission system of claim 52, wherein the fiber optic communication link is less than 300 kilometers in length.

61. The fiber optic transmission system of claim 52, wherein the electro-absorption modulated laser modulates information onto the optical signal at a rate of at least 9.5 gigabits per second.

62. A fiber optic transmission system for transmitter compensation, comprising:

a plurality of transmitters operable to generate a plurality of optical signals, at least at least a majority of the plurality of transmitters including an electro-absorption modulated laser comprising a light source and an electro-absorption modulator, the electro-absorption modulated laser operable to generate an optical signal having a distortion associated therewith;

a combiner operable to combine the plurality of optical signals into a wavelength division multiplexed multiple wavelength signal for communication to a fiber optic communication link;

a Raman amplifier stage coupled to the fiber optic communication link, the Raman amplifier comprising a gain medium having a negative dispersion;

wherein the gain medium is operable to at least partially compensate for a chirp caused by plurality of electro-absorption modulated lasers, and wherein the Raman amplifier stage is operable to at least partially compensate for a loss associated with the gain medium.

63. The fiber optic transmission system of claim 62, the Raman amplifier stage is operable to introduce a net gain to the optical signal in the fiber having the negative slope of dispersion.

64. The fiber optic transmission system of claim 62 wherein the net gain is 5 decibels.

65. The fiber optic transmission system of claim 62, wherein an amplifier comprising the Raman amplifier stage comprises an effective noise figure less than eight (8) decibels.

66. The fiber optic transmission system of claim 62, wherein the dispersion compensation element has a magnitude of dispersion greater than 2 ps/nm*km.

67. The fiber optic transmission system of claim 62, wherein the dispersion compensation element has a magnitude of dispersion greater than 5 ps/nm*km.

68. The fiber optic transmission system of claim 62, wherein the fiber optic communication link is greater than 300 kilometers in length between any optical regenerators.

69. The fiber optic transmission system of claim 62, wherein the fiber optic communication link is less than 300 kilometers in length.

70. The fiber optic transmission system of claim 62, wherein the electro-absorption modulated laser modulates information onto the optical signal at a rate of at least 9.5 gigabits per second.

71. The fiber optic transmission system of claim 62, further comprising:

a plurality of receivers operable to receive the optical signals from the fiber optic communications link.

72. The fiber optic transmission system of claim 62, further comprising:

a demultiplexer operable to selectively provide the optical signals to the plurality of receivers.

73. A method for compensating transmitter signal distortion, comprising:

receiving from a communication link at a Raman amplification stage comprising a gain medium having a negative slope of dispersion, an optical signal generated using an electro-absorption modulated laser formed on a single substrate, the electro-absorption modulated laser comprising a light source and an electro-absorption modulator, the optical signal having a distortion caused by the laser;

performing dispersion compensation in the Raman amplification stage using the gain medium to at least partially compensate for the distortion caused by the electro-absorption modulated laser;

performing amplification in the Raman amplification stage to compensate for a loss introduced by the dispersion compensation and to provide additional gain for the optical signal.

74. The method of claim 73, wherein performing Raman amplification comprises introducing a net gain to the optical signal in the fiber having the negative slope of dispersion.

75. The method of claim 73, wherein the dispersion compensation performed has a magnitude of dispersion greater than 2 ps/nm*km.

76. The method of claim 73, wherein the dispersion compensation performed has a magnitude of dispersion greater than 5 ps/nm*km.

77. The method of claim 73, wherein the distortion of the optical signal caused by the electro-absorption modulated laser comprises a chirp.

78. The method of claim 73, further comprising: generating the optical signal using an electro-absorption modulated laser; and communicating the optical signal to the fiber optic communication link.

79. The method of claim 73, wherein the optical signal comprises a bit rate of at a rate of at least 9.5 gigabits per second.

80. A fiber optic transmission system with transmitter compensation, comprising:
- a continuum source comprising:
  - a continuum source transmitter operable to generate an approximate spectral continuum; and
  - a signal splitter operable to separate the approximate spectral continuum into a plurality of wavelength signals;
- an electro-absorption modulator operable to modulate information onto at least one of the plurality of wavelength signals for transmission over a fiber optic communication link;
- a Raman amplifier stage coupled to the communication link, the Raman amplifier stage having a gain medium including a dispersion compensating fiber;
- wherein the dispersion compensating fiber is operable to at least partially compensate for a distortion caused by the continuum source, and wherein the Raman amplifier stage is operable to at least partially compensate for a loss associated with the dispersion compensation fiber.

81. The fiber optic transmission system of claim 80, wherein the distortion caused by the continuum source comprises a chirp.

82. The fiber optic transmission system of claim 80, wherein the distortion caused by the continuum source comprises a low output power level.

83. The fiber optic transmission system of claim 80, wherein the Raman amplification stage comprises a discrete Raman amplification stage.

84. The fiber optic transmission system of claim 80, wherein an amplifier comprising the Raman amplifier stage is operable to introduce a net gain in the dispersion compensating fiber to the optical signal.

85. The fiber optic transmission system of claim 84 wherein the net gain is 5 decibels.

86. The fiber optic transmission system of claim 80, wherein an amplifier comprising the Raman amplifier stage comprises an effective noise figure less than eight (8) decibels.

87. The fiber optic transmission system of claim 80, wherein the dispersion compensating fiber comprises a negative sign of dispersion.

88. The fiber optic transmission system of claim 80, wherein the dispersion compensation element has a magnitude of dispersion greater than 10 ps/nm*km.

89. A fiber optic transmission system with transmitter compensation, comprising:
- a low cost optical transmitter operable to generate an optical signal for transmission over a fiber optic communication link, the optical signal comprising a chirp caused by the low cost optical transmitter;
- a combiner coupled to the low cost optical transmitter and operable to combine the optical signal and at least one other optical signal into a multiple wavelength optical signal for transmission over the fiber optic communication link;
- a Raman amplifier stage coupled to the communication link, the Raman amplifier stage having a gain medium including a dispersion compensating fiber, the dispersion compensating fiber comprising a negative sign of dispersion;
- wherein the dispersion compensating fiber is operable to at least partially compensate for the chirp caused by the low cost optical transmitter, and wherein the Raman amplifier stage is operable to at least partially compensate for a loss associated with the dispersion compensation fiber.

90. The fiber optic transmission system of claim 89 wherein the low cost optical transmitter comprises a continuum source comprising:
- a continuum source transmitter operable to generate an approximate spectral continuum; and
- a signal splitter operable to separate the approximate spectral continuum into a plurality of wavelength signals for transmission over a fiber optic communication link.

91. The fiber optic transmission system of claim 89 wherein the low cost optical transmitter comprises an electro-absorption modulated laser.

92. The fiber optic transmission system of claim 89, wherein the distortion caused by the optical transmitter comprises a low output power level.

93. The fiber optic transmission system of claim 80, further comprising a combiner operable to combine the plurality of wavelength signals into a wavelength division multiplexed optical signal for transmission over the fiber optic communication link.

* * * * *